Oct. 9, 1928.

F. R. HOUSE 1,686,525

SEARCHLIGHT SHUTTER

Filed Sept. 3, 1924

Inventor
FRANK R. HOUSE.
By his Attorney
Herbert H. Thompson

Patented Oct. 9, 1928.

1,686,525

UNITED STATES PATENT OFFICE.

FRANK R. HOUSE, OF BALDWIN HARBOR, NEW YORK, ASSIGNOR TO THE SPERRY GYROSCOPE COMPANY, OF BROOKLYN, NEW YORK, A CORPORATION OF NEW YORK.

SEARCHLIGHT SHUTTER.

Application filed September 3, 1924. Serial No 735,539.

This invention relates to searchlights and more particularly to the front closures of said searchlights whereby said light may be used either as a concentrated parallel beam or as a flood light.

Another object of this invention is the provision of a simple means whereby said searchlight may be employed for signalling purposes by utilizing a simple mechanical movement requiring the expenditure of very little effort on the part of an operator.

Another object of this invention is the provision of a single means which may be utilized for signalling purposes or for completely occulting the light merely by varying the degree of operation of a single operating member.

Other objects and advantages of this invention will become apparent in the following detailed description.

In the accompanying drawings

Figure 1:
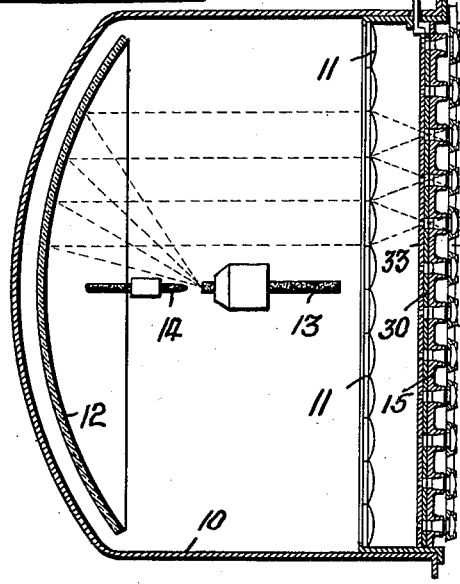
Fig. 1 is a horizontal section through the drum of a searchlight embodying my invention, only the parts necessary to illustrate my invention being shown.
Figure 3:
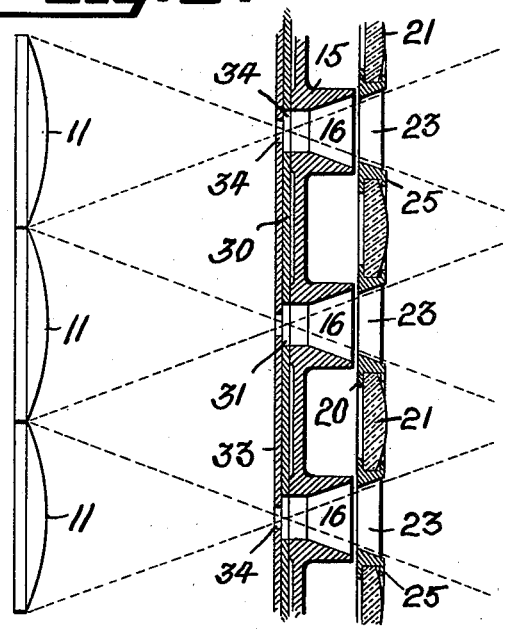
Fig. 3 is a view similar to Fig. 2 showing the parts in the positions which they occupy when the searchlight is used for flood lighting.

Referring to the drawings, there is shown in Fig. 1 a searchlight drum 10 provided with a mirror 12, positive and negative electrodes 13, 14 and a front window composed of a plurality of converging lenses in the form of longitudinal strips of convex glass 11 for concentrating the light from the arc at a plurality of focal points, the light then diverging to form a flood light (see Fig. 3).

The front window is set back slightly from the extreme front of the drum in order to permit the mounting of my novel signalling, occulting and beam-forming devices.

Figure 2:
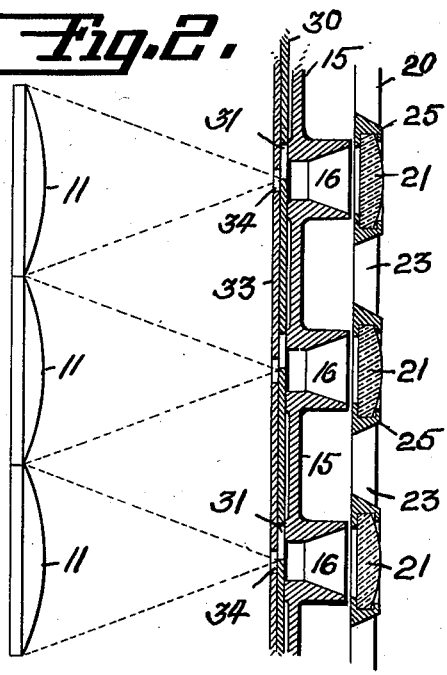
Fig. 2 is an enlarged view of a portion of the device shown in Fig. 1, the parts being shown in the position which they occupy when the searchlight is used for signalling.
Figure 4:
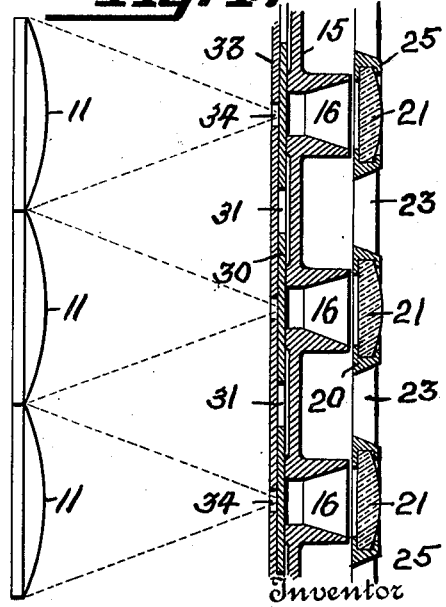
Fig. 4 is a view similar to Figs. 2 and 3, showing the parts in position for complete occultation.

Adjacent the front of the drum is a fixed member 15, positioned just beyond the plane of the foci of the lenses, as shown more clearly in Figs. 2 to 4, said member being provided with a plurality of openings 16 diverging outwardly, the inner surfaces of said openings being substantially adjacent the focal points of the lights concentrated by the lenses 11, so that the light passes from such focal points in divergent beams outwardly through the divergent openings 16. In front of said openings 16 is slidably mounted a member 20, carrying a plurality of converging lenses 21 positioned to cooperate with the outer ends of openings 16, in one position of member 20, so that the divergent beams of light from the lenses 11 are concentrated to form parallel beams 22, as shown in Fig. 1. The lenses 21 are mounted in suitable holders 25 in said member 20 and are positioned in spaced relation to co-operate with the spaced openings 16, the spaces between adjacent lenses 21 forming diverging openings 23. When, however, the searchlight is to be used for flood light purposes, the member 20 is moved to bring openings 23 into co-operative relation with openings 16. The openings 23 are so formed as to be in effect extensions of diverging openings 16, so that the light is free to diverge as shown in Fig. 3 to form diverging beams or flood-lights.

For completely occulting the light I provide a single movable member in place of the complicated iris shutter and Venetian blinds heretofore employed. For this purpose I provide member 30 slidable laterally along the inner surface of member 15 and having apertures 31 which may be brought into co-operative relation with the inner ends of openings 16 to permit the light to pass through when the lamp is in operation. When the light is to be occulted, however, the single member 30 needs only to be slid laterally to move the apertures 31 out of co-operative relation with the openings 16 to completely close said openings without any possibility of light passing therethrough. For guiding the occulting plate 30 I may provide a fixed guide plate 33 between which and the plate 15 the said plate 30 may slide. The plate 33 is, of course, provided with apertures 34 for permitting the light to pass therethrough but since the said plate 33 is positioned substantially in the plane of the foci of lenses 11, the said apertures 34 need be comparatively small.

It will be seen from the above description that the occulting plate 30 moves in substantially the plane of the foci of the lenses 11. Advantage is taken of this fact to utilize the said plate 30 for signalling purposes for it is apparent that the said plate need be moved only sufficiently to bring apertures 31 therein slightly beyond the said foci to cut off substantially all of the light, which is sufficient for signalling purposes, so that a very slight movement of plate 30 will be sufficient for signalling purposes, as shown in Fig. 2, while a greater movement of said plate, as shown in Fig. 4, will accomplish complete occultation.

It will be understood that suitable provision is made for guiding the slidable members 20 and 30 such, for example, as guide channels at their upper and lower edges and suitable handles or operating members such as bell cranks 36 and 37, may be provided for readily actuating the said slidable members.

It will be further understood that all of the views shown are merely horizontal sections and that the various apertures, such as 16, 31 and 34, are not circular in the form shown, but are rectangular and that the lenses 21 are longitudinal or rectangular strips similar to lens strips 11. When, however, one or more circular lenses 11 are employed, then it will be understood that the lenses 21 and apertures 16, 31 and 34 will be correspondingly circular in section, the same principles involved in this invention applying.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a searchlight, a plurality of similar converging lenses having their foci in a single plane, a member positioned substantially in said plane and having a plurality of apertures through which said lenses may focus the light, and means for actuating said member to move said apertures beyond said foci and cut off the light.

2. In a searchlight, a converging lens, a member having an opening positioned so that the focused light diverges therethrough, a single operable member substantially in the plane of the lense focus and having an aperture through which the light may be focused, and means for operating said member to a plurality of positions, the first position being with its aperture just beyond the lens focus to cut off substantially all of the light, and the second position being with its aperture beyond said opening to cut off all of the light.

3. In a searchlight, a converging lens, a member positioned just beyond the focus of said lens and having an opening through which the light from said lens diverges, a member movably mounted beyond said first member and having a converging lens adapted to cooperate with said opening to concentrate the light.

4. In a searchlight, a converging lens, a member positioned just beyond the focus of said lens and having an opening through which the light from said lens diverges a member movably mounted beyond said first member and having a converging lens and an opening so that one or the other may be caused to cooperate with said first opening to concentrate the light or permit the light to diverge, respectively.

5. In a searchlight, a plurality of converging lenses, a member positioned just beyond the plane of the foci of said lenses and having openings through which the light from said lenses diverges, a second member movably mounted beyond said first member, said second member having a plurality of converging lenses and a plurality of openings, said lenses and openings being positioned so that one or the other may be caused to cooperate with said first openings to concentrate the light or permit the light to diverge, respectively.

6. In a searchlight, a plurality of converging lenses, a member positioned just beyond the plane of the foci of said lenses and having openings through which the light from said lenses diverges, a second member movably mounted beyond said first member, said second member having a plurality of converging lenses and a plurality of openings, said lenses and openings being positioned so that one or the other may be caused to cooperate with said first openings to concentrate the light or permit the light to diverge, respectively, and a third member movably mounted substantially in the plane of the foci of said first lenses and having a plurality of apertures through which the light from said first lenses may pass, said third member being operable to move said apertures beyond said foci and cut off the light.

In testimony whereof I have affixed my signature.

FRANK R. HOUSE.